(12) United States Patent
Nilvius

(10) Patent No.: US 11,203,302 B2
(45) Date of Patent: Dec. 21, 2021

(54) VEHICLE CARRIER BOX

(71) Applicant: Thule Sweden AB, Hillerstorp (SE)

(72) Inventor: Anders Nilvius, Värnamo (SE)

(73) Assignee: Thule Sweden AB, Hillerstorp (SE)

( * ) Notice: Subject to any disclaimer, the term of this patent is extended or adjusted under 35 U.S.C. 154(b) by 0 days.

(21) Appl. No.: 17/251,561

(22) PCT Filed: Jun. 13, 2019

(86) PCT No.: PCT/EP2019/065439
§ 371 (c)(1),
(2) Date: Dec. 11, 2020

(87) PCT Pub. No.: WO2019/238802
PCT Pub. Date: Dec. 19, 2019

(65) Prior Publication Data
US 2021/0245670 A1    Aug. 12, 2021

(30) Foreign Application Priority Data

Jun. 13, 2018 (EP) .................................. 18177542

(51) Int. Cl.
*B60R 9/055* (2006.01)
*E05F 1/10* (2006.01)
(Continued)

(52) U.S. Cl.
CPC .............. *B60R 9/055* (2013.01); *E05F 15/53* (2015.01); *E05D 3/02* (2013.01); *E05F 1/1058* (2013.01);
(Continued)

(58) Field of Classification Search
CPC .......... B60R 9/055; E05F 15/50; E05F 15/51; E05F 1/1058; E05Y 2201/604
See application file for complete search history.

(56) References Cited

U.S. PATENT DOCUMENTS 3,640,423 A * 2/1972 Parker ..................... B60R 11/06
220/324
4,974,766 A * 12/1990 DiPalma ................. B60R 9/055
224/328

(Continued)

FOREIGN PATENT DOCUMENTS

EP        3269601 A1    1/2018
EP        3369626 A1    9/2018
(Continued)

OTHER PUBLICATIONS

International Search Report and Written Opinion of the International Searching Authority for International Application Mo. PCT/EP2019/065439, European Patent Office (EPO), Rijswijk, dated Aug. 12, 2019, 12 pages.

*Primary Examiner* — Justin M Larson
(74) *Attorney, Agent, or Firm* — Sterne, Kessler, Goldstein & Fox P.L.L.C.

(57) ABSTRACT

The present disclosure relates to a vehicle carrier box having a lid and a base. The carrier box has first and second longitudinal sides and first and second transverse sides. The lid and the base are connected by a first and a second lid lifter, the first lid lifter being arranged at the first transverse side and the second lid lifter being arranged at the second transverse side. Moreover, the first lid lifter includes a first pivotable link arm connecting the lid to the base, and the second lid lifter comprises a second pivotable link arm connecting the lid to the base, the first and second lid lifters furthermore including an equalization arrangement for equalization of the forces exerted by the first and second lid lifters on the lid upon opening of the lid.

13 Claims, 4 Drawing Sheets

(51) Int. Cl.
   *E05F 15/00*   (2015.01)
   *E05F 15/53*   (2015.01)
   *E05F 15/50*   (2015.01)
   *E05F 15/51*   (2015.01)
   *E05D 3/02*   (2006.01)

(52) U.S. Cl.
   CPC .............. *E05F 15/50* (2015.01); *E05F 15/51* (2015.01); *E05Y 2201/448* (2013.01); *E05Y 2201/604* (2013.01); *E05Y 2201/654* (2013.01); *E05Y 2900/602* (2013.01)

(56) References Cited

U.S. PATENT DOCUMENTS

| | | | | |
|---|---|---|---|---|
| 5,531,498 | A * | 7/1996 | Kowall | E05B 81/22 296/146.4 |
| 5,546,705 | A * | 8/1996 | Hirtsiefer | B60R 9/055 49/386 |
| 5,823,411 | A * | 10/1998 | Gronwoldt | E05D 15/502 224/328 |
| 5,982,126 | A * | 11/1999 | Hellinga | B60J 5/06 318/286 |
| 6,055,776 | A * | 5/2000 | Dettling | E05F 15/619 296/56 |
| 6,341,809 | B1 * | 1/2002 | Chapman | E05F 1/1058 296/146.8 |
| 6,347,484 | B1 * | 2/2002 | Swanger | B60J 7/1642 49/193 |
| 6,719,356 | B2 * | 4/2004 | Cleland | E05F 1/1091 296/146.8 |
| 6,959,846 | B2 * | 11/2005 | Schomaker | B60P 3/075 220/324 |
| 7,014,144 | B2 * | 3/2006 | Hein | B64D 33/02 244/53 B |
| 7,040,675 | B1 * | 5/2006 | Ott | B60J 7/19 292/123 |
| 7,240,974 | B2 * | 7/2007 | Hirtsiefer | E05D 15/262 312/109 |
| 7,407,213 | B2 * | 8/2008 | Eschebach | B62D 33/0273 296/57.1 |
| 7,416,098 | B2 * | 8/2008 | Settelmayer | B60R 9/058 224/309 |
| 7,503,470 | B2 * | 3/2009 | Settelmayer | B60R 9/055 224/309 |
| 7,740,157 | B2 * | 6/2010 | Fisher | B60R 9/055 224/328 |
| 8,096,455 | B2 * | 1/2012 | Viklund | E05C 19/12 224/328 |
| 8,387,842 | B2 | 3/2013 | Elliott et al. | |
| 8,672,198 | B2 * | 3/2014 | Viklund | B60R 9/055 224/328 |
| 8,757,457 | B2 * | 6/2014 | Settelmayer | B60R 9/055 224/328 |
| 8,851,346 | B2 | 10/2014 | Fritsche et al. | |
| 9,387,811 | B2 * | 7/2016 | Viklund | B60R 9/055 |
| 9,682,660 | B2 * | 6/2017 | Viklund | E05C 19/12 |
| 10,464,497 | B2 * | 11/2019 | Kondo | B60R 9/055 |
| 10,703,293 | B2 * | 7/2020 | Dickinson | B60R 9/055 |
| 2006/0181108 | A1 * | 8/2006 | Cleland | E05F 15/43 296/146.4 |
| 2007/0164066 | A1 * | 7/2007 | Jones | B60R 9/055 224/328 |
| 2011/0186608 | A1 * | 8/2011 | Sautter | B60R 9/055 224/328 |
| 2014/0352216 | A1 * | 12/2014 | Kapustnyk | E05F 15/50 49/31 |
| 2015/0143942 | A1 * | 5/2015 | Lalonde | B60R 5/00 74/501.6 |
| 2015/0204526 | A1 * | 7/2015 | Nilvius | B60Q 3/30 362/154 |
| 2015/0217699 | A1 * | 8/2015 | Hubbard | B60R 9/055 224/328 |
| 2020/0282917 | A1 * | 9/2020 | Sagen | B60R 9/052 |

FOREIGN PATENT DOCUMENTS

| | | |
|---|---|---|
| SU | 1729852 A1 | 4/1992 |
| WO | 2017073191 A1 | 5/2017 |

* cited by examiner

VEHICLE CARRIER BOX

TECHNICAL FIELD

The disclosure pertains to a vehicle carrier box. More specifically, the present disclosure pertains to a vehicle carrier box comprising a lid and a base, the lid and the base being connected by a first and a second lid lifter.

BACKGROUND

Load carrier boxes for vehicles, and especially roof boxes for vehicles, are widely used to provide for an enhanced loading capability. Roof boxes for vehicles are especially useful as they utilize a part of the vehicle not otherwise utilized. Roof boxes generally have a base and a lid and very often a longitudinal form to provide good volume with relatively low wind resistance. Roof boxes are generally manufactured in light weight material such as fiber reinforced composite material. Although such material is strong and tough, it can be slightly flexible, especially when larger pieces are used which may detract from the stability of the roof box during opening and closing thereof. The lid and base of such load carrier boxes are generally hingedly connected to each other. The base and the lid may additionally be connected by a first and a second lid lifter. The first and second lid lifters are provided to assist the user in moving or pivoting the lid of the roof such that the user needs less force to operate the lid. The lid lifters may also assist the user in holding the lid in an open position.

When the lid is lifted upwardly, such as during loading or unloading of the carrier box, the lid lifters are generally arranged to support the lid and to move essentially in parallel. However, due to the large-size lid and the slightly flexible material, there is still a need to improve the stability of the lid during operation of the lid.

Accordingly, it is an object of the present disclosure to offer a vehicle carrier box with improved stability during opening and/or closing of the lid.

SUMMARY

One or more of the above objects may be achieved with a vehicle carrier box according to claim 1. Further embodiments are set out in the dependent claims, in the following description and in the drawings.

As such, the present disclosure relates to a vehicle carrier box comprising a lid and a base. The carrier box has first and second longitudinal sides and first and second transverse sides. The lid and the base are connected by a first and a second lid lifter, the first lid lifter being arranged at the first transverse side and the second lid lifter being arranged at the second transverse side. Moreover, the first lid lifter comprises a first pivotable link arm connecting the lid to the base, and the second lid lifter comprises a second pivotable link arm connecting the lid to the base. The first and second lid lifters comprises an equalization arrangement for equalization of the forces exerted by the first and the second lid lifter on the lid upon operation of the lid.

Vehicle carrier boxes may be provided with lid lifters to assist the users in operating the lid using less force and to hold the lid in open position, for example during loading and unloading of the carrier box.

The lid lifters according to the present disclosure comprises first and second pivotable link arms, which first and second pivotable link arms each may comprise a first and a second link pivotably connected to the lid and the base of the carrier box. The first link and the second link can be elements or assemblies which are able to transfer force from their respective first end to their respective second end. In particular, the first link and the second link can be realized in the form of a lever or an arm which are hingedly couplable to further elements at their respective ends. The first link and the second link can comprise rigid force transfer bodies and can be rod- or pole-shaped, for instance. Of course, the first link and the second link can comprise different shapes. Furthermore, it is possible that one of the first link and the second link is formed such that it is able to accommodate at a portion of the other link.

In order to provide a pivotable coupling between the first link and the second link, the respective first ends of the links can be specifically designed. For example, one of the first link and the second link can comprise a pivot pin attached on or integrally formed with the same and the other one of the second link and the first link can comprise an opening forming a bearing for accommodating the pivot pin therein. The respective second ends of the links can be configured similarly and provide for a suitable coupling to the lid or the base respectively.

Vehicle carrier boxes are used for increasing the loading capacity of the vehicles and are generally relatively large, they are also generally manufactured in light weight material, such as composite materials. Although such materials are strong and tough, large relatively thin pieces such as carrier box lids can be slightly flexible. If an unequal lifting force is applied to the lid during operation of the lid the movement of the lid lifter may become unsynchronized and the lid may seem unstable to the user and may require manipulation in order to align the lid with the base when closing the carrier box. The provision of an equalization arrangement to the lid lifters for equalization of the forces exerted on the lid by the first and the second lid lifter upon operation of the lid provides a smoother and stable operation of the lid.

By "equalization arrangement" herein is meant an arrangement for mechanical power or electrical power transmission between the first and second lid lifters such that the lid lifters exert synchronized forces on the lid, independently of where, along the longitudinal side of the carrier, a lifting force on the lid is applied.

In the vehicle carrier box as disclosed herein the equalization arrangement may be adapted for wireless connection for equalization of the forces exerted by the first and the second lid lifters on the lid upon opening of the lid. The wireless connection may for example provide electromagnetic power transfer between a sender and a receiver, e.g. via Bluetooth™, wi-fi, GSM or other wireless network, arranged in connection to the lid lifters.

The equalization arrangement may also comprise wireless activation of each of the lid lifters separately such that the forces exerted on the lid by the first and the second lid lifter are equalized and the operation of the lid is smooth and stable.

In the vehicle carrier box as disclosed herein the equalization arrangement may comprise a connector element, connecting the first and said second lid lifters. The connector element is configured for equalization of the forces between the first lid lifter and the second lid lifter which are exerted on the lid upon opening/closure of the lid.

A connector element configured for power transmission between the lid lifters, may, thus extend between and physically connect the first and the second lid lifters and enable a force transmission upon opening and closure of the lid, synchronizing the movement of the lid lifters and the forces exerted by the lid lifters on the lid, thereby providing a smoother opening and closure of the vehicle carrier box.

The first and second lid lifters of the vehicle carrier box may be electrically, hydraulically, mechanically and/or pneumatically coupled to each other.

In the vehicle carrier box as disclosed herein the connector element may comprise a wire. The first and second lid lifters are then mechanically coupled with a wire extending between the lid lifters for transmitting mechanical power between the lid lifters and supporting synchronization of the movement of the lid lifters and equalization of the forces exerted by the lid lifters on the lid upon opening of the lid. If unequal lifting forces are applied along the longitudinal side of the carrier box upon opening of the box, this may result in an unsynchronized movement of the lid lifters and unequal forces applied to the lid resulting in lid instability. The equalization arrangement comprising a wire will provide a force transmittance via the wire from the lid lifter to which a greater force is applied over to the other lid lifter leading to an equalization of the forces exerted by the lid lifters on the lid upon opening.

The wire may be arranged in a sleeve having a sleeve diameter, the wire being slideably arranged within the sleeve. The wire may for example be a metal, such as a steel, wire and the sleeve may for example be made of synthetic resin.

In the vehicle carrier box as disclosed herein, the first and/or the second lid lifter may comprise a wire-control device, such as a pulley, the wire being at least partly wound around the wire-control device, the wire control device being arranged to promote a distribution of forces when the lid is being pulled open.

The first and second lid lifters may each comprise a wire-control device transmitting mechanical power, such as across an axle of each of the wire-control device. The wire-control device may be designed to support movement and promote a distribution of forces when the lid is being pulled open and when an unequal lifting force is applied, as seen in the longitudinal direction of the carrier box.

In the vehicle carrier box as disclosed herein the connector element may comprise more than one wire, such as two wires extending in parallel between the lid lifters. Thus, the first and second lid lifters may be mechanically coupled with two wires, both extending between the lid lifters for transmitting mechanical power between the lid lifters and supporting synchronization of the movement of the lid lifters upon opening and closure of the lid.

The first lid lifter may comprise a first wire-control device arranged at/on the first lid lifter and the second lid lifter may comprise a second wire-control device arranged at/on the second lid lifter. When the connector device comprises a first and a second wire, the wires may both extend between and each be attached to the first wire-control device at a first wire first end and to the second wire control device at a first wire second end. The wire-control device may for example be a pulley.

In the vehicle carrier box as disclosed herein, the first and the second lid lifter may each comprise a first and a second support plate, each of the first and second support plates being provided with a first and a second opening, through which first and second openings the wire extends. The sleeve may extend from the first support plate to the second support plate, with the first and second openings having an opening diameter, the opening diameter being smaller than a diameter of the sleeve. When the connector device comprises a first and a second wire, the first and second lid lifters may each be provided with two support plates, or one support plate with two openings, one for each wire. The support plates may be vertically standing support plates, i.e. upright standing and having a major extension in a height direction of the vehicle carrier box.

Such support plates may enable movement of the wire through the first and second support plates and pulling of the wire slideably arranged within the sleeve while the sleeve, extending between and up to the first and second support plates, remains secured between the support plates thereby allowing transmission of forces between the first and second lid lifters upon opening and closure of the lid.

The sleeve may comprise a first telescoping end portion abutting the first support plate and/or a second telescoping end portion abutting the second support plate, the telescoping end portions being arranged to adjust a tension of the wire. When the connector element comprises a first and a second wire, each wire may be arranged in a sleeve, i.e. in a first and a second sleeve, wherein the first and the second sleeve may, in each of their respective end portions, comprise a telescoping end portion abutting a support plate.

The first and/or the second lid lifter may comprise an adjustment bolt connected to the first and/or second support plate respectively and arranged to adjust the tension of the wire.

In the vehicle carrier box as disclosed herein, the base may comprise a side wall and a bottom wall, wherein the wire(s) may be attached, directly or indirectly, to the side wall and/or to the bottom wall.

In the vehicle carrier box as disclosed herein, the connector element may comprise a first and a second wire being provided in a respective sleeve, wherein the first lid lifter comprises a first wire-control device and the second lid lifter comprises a second wire-control device. Each of the wire-control devices may be in the form of a pulley. The first wire may be connected to the first wire control device at a first wire first end and to the second wire control device at a first wire second end. The second wire may be connected to the first wire control device at a second wire first end and to the second wire control device at a second wire second end. The wire control devices being arranged to promote a distribution of forces when the lid is being pulled open or is being closed.

The carrier box as disclosed herein, may comprise at least a third and a fourth lid lifter, the third and the fourth lid lifters comprising the features of the first and the second lid lifters respectively as disclosed herein.

In the vehicle carrier box as disclosed herein the lid and the bottom may be hingedly connected by one or more hinge elements arranged at the second longitudinal side of the carrier box.

The vehicle carrier box may be a roof box.

Roof boxes generally have a longitudinal form and an outer profile combining good volume with relatively low wind resistance. Roof boxes are furthermore generally manufactured in light weight material such as fiber reinforced composite material. The first and second lid lifters provided with an equalization arrangement according to the present disclosure provided stability to the flexible and large-sized lid during operation of the lid.

BRIEF DESCRIPTION OF THE DRAWINGS

The present invention will be further explained hereinafter by means of non-limiting examples and with reference to the appended drawings wherein.

DETAILED DESCRIPTION

It is to be understood that the drawings are schematic and that individual components are not necessarily drawn to scale. The vehicle carrier box, lid lifters and connector elements shown in the figures are provided as examples only and should not be considered limiting to the invention. Accordingly, the scope of the invention is determined solely by the appended claims.

Figure 1:
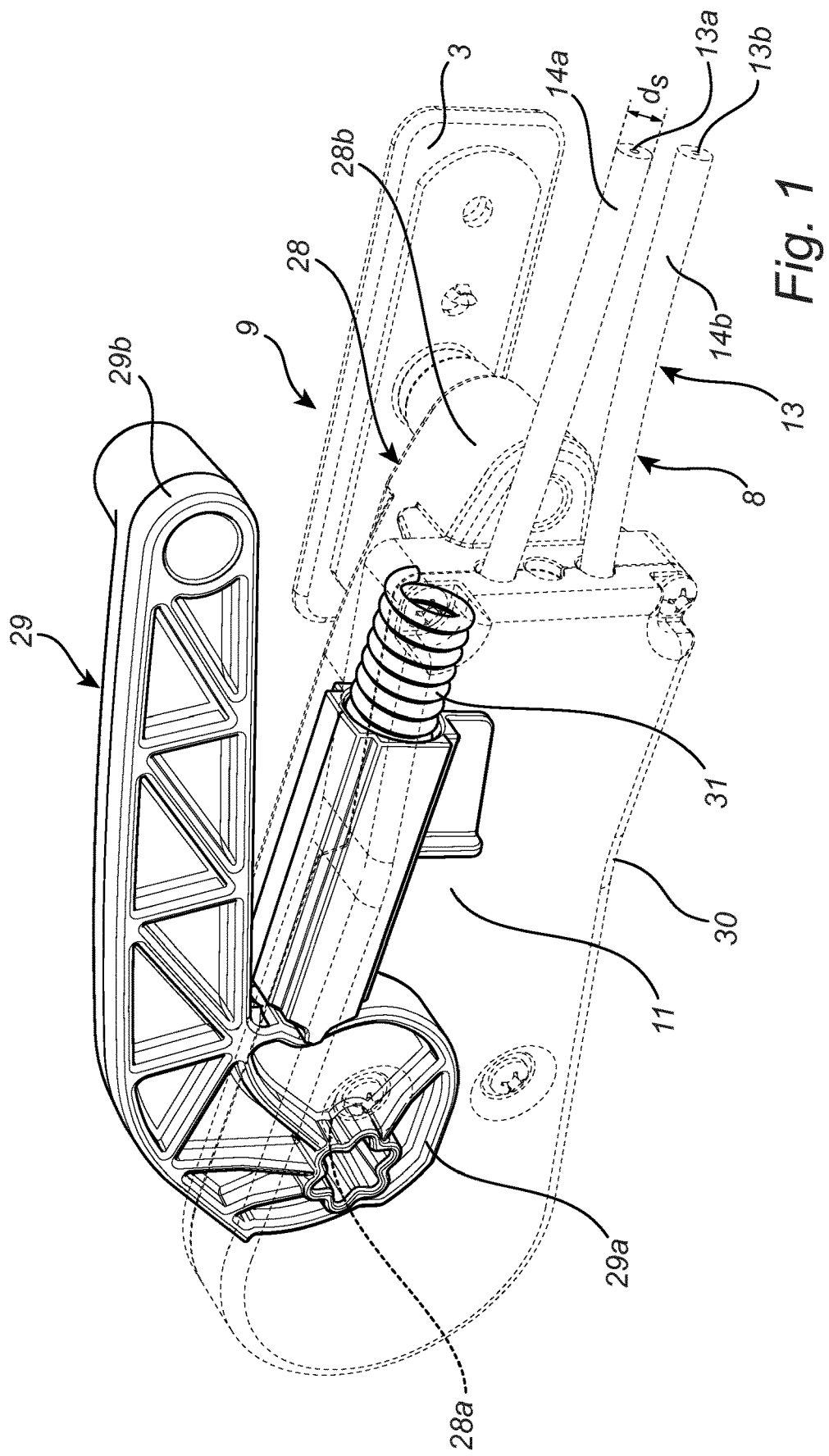
FIG. 1 illustrates a perspective view of a first lid lifter according to the present disclosure.

With reference to FIG. 1 there is shown a first lid lifter 9. The first lid lifter 9 comprises a first pivotable link arm 11 comprising a first link 28 and a second link 29 pivotably coupled to each other at a respective first end portion 28a, 29a. The first link 28 and the second link 29 furthermore comprises a respective second end portion 28b, 29b which are configured such that the second end portion 28b of the first link 28 may be mounted to a base 3 of a vehicle roof box 1 and the second end portion 29b of the second link 29 may be mounted to a lid 2 of a roof box 1 (see FIG. 4). The first lid lifter 9 shown in this figured is configured such that the second end 28b of the first link 28 is configured to be coupled to the base 3 of the roof box 1 and the second end 29b of the second link 29 is configured to be coupled to the lid 2 of the roof box 1. The first link 28 is pivotably coupled to the second link 29 about a pivot axis, in particular pivotable between a closed position and an open position of the first lid lifter 9, corresponding to a closed and opened position of the roof box 1. The first lid lifter 9 comprises an equalization arrangement 8 including a connector element 13 in the form of a first and a second wire 13a, 13b. The first and second wires 13a, 13b are slideably arranged in a respective sleeve 14a, 14b having a sleeve diameter ds.

As further illustrated in FIG. 1, the first lid lifter 9 furthermore comprises a force application mechanism 31, here in the form of a spiral spring 31, for applying an assistive force on the first link 28, the force application mechanism 31 may however alternatively be provided on the second link 29. Advantageously, the force application mechanism 31 is configured to provide at least an urging force for urging the lid 2 towards the open position of the roof box 1. The first lid lifter 9 furthermore comprises a housing 30 partly accommodating the equalization arrangement 8. The cover 30, the first link 28 and the equalization arrangement 8 are illustrated with dotted lines to visualize the connection between the first and second link 28, 29 and also the force application mechanism 31. The dotted lines are thus only for illustrative purposes and should thus not be understood as defining the scope of the invention.

Figure 2:
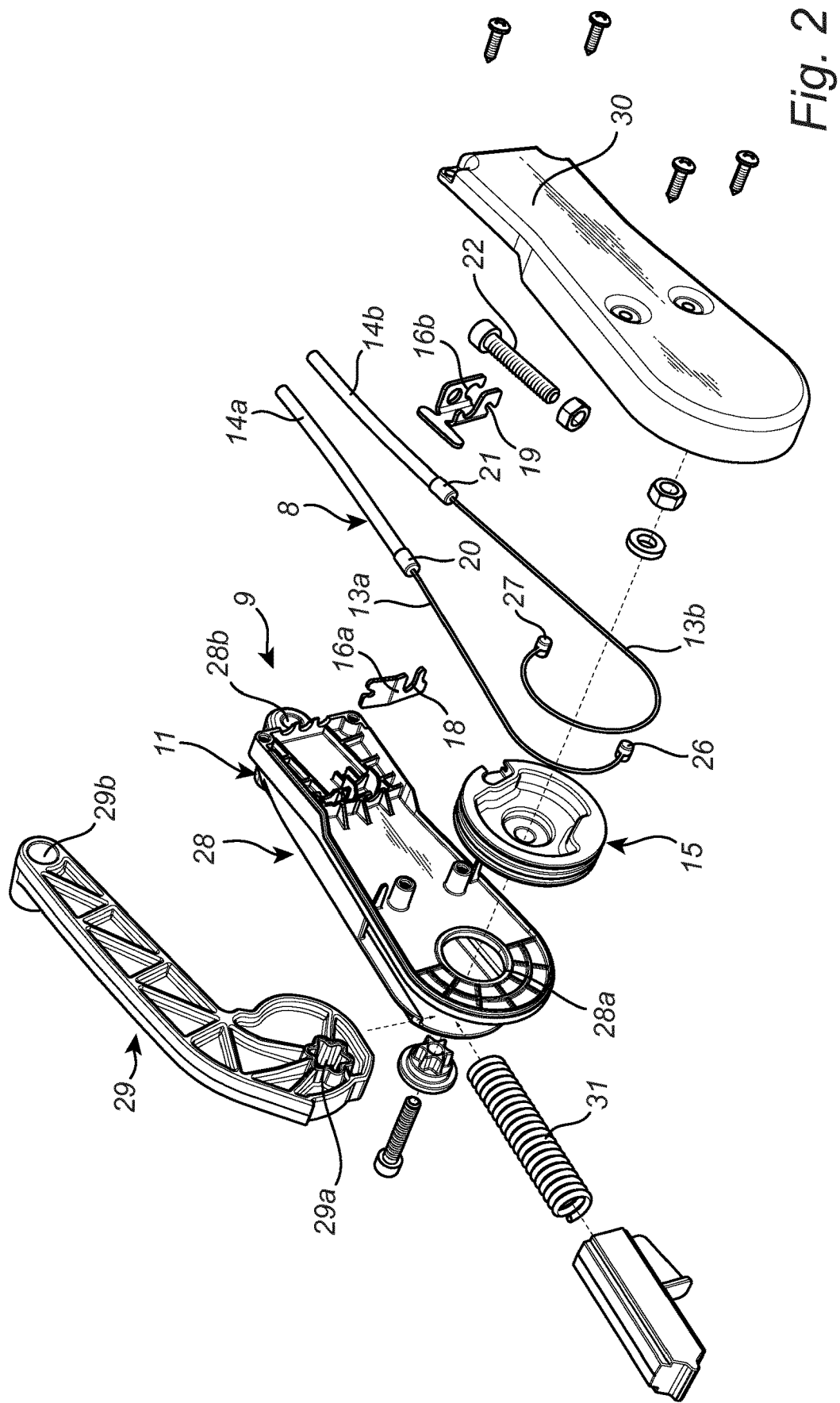
FIG. 2 illustrates an exploded view of a first lid lifter according to the present disclosure.
Figure 3:
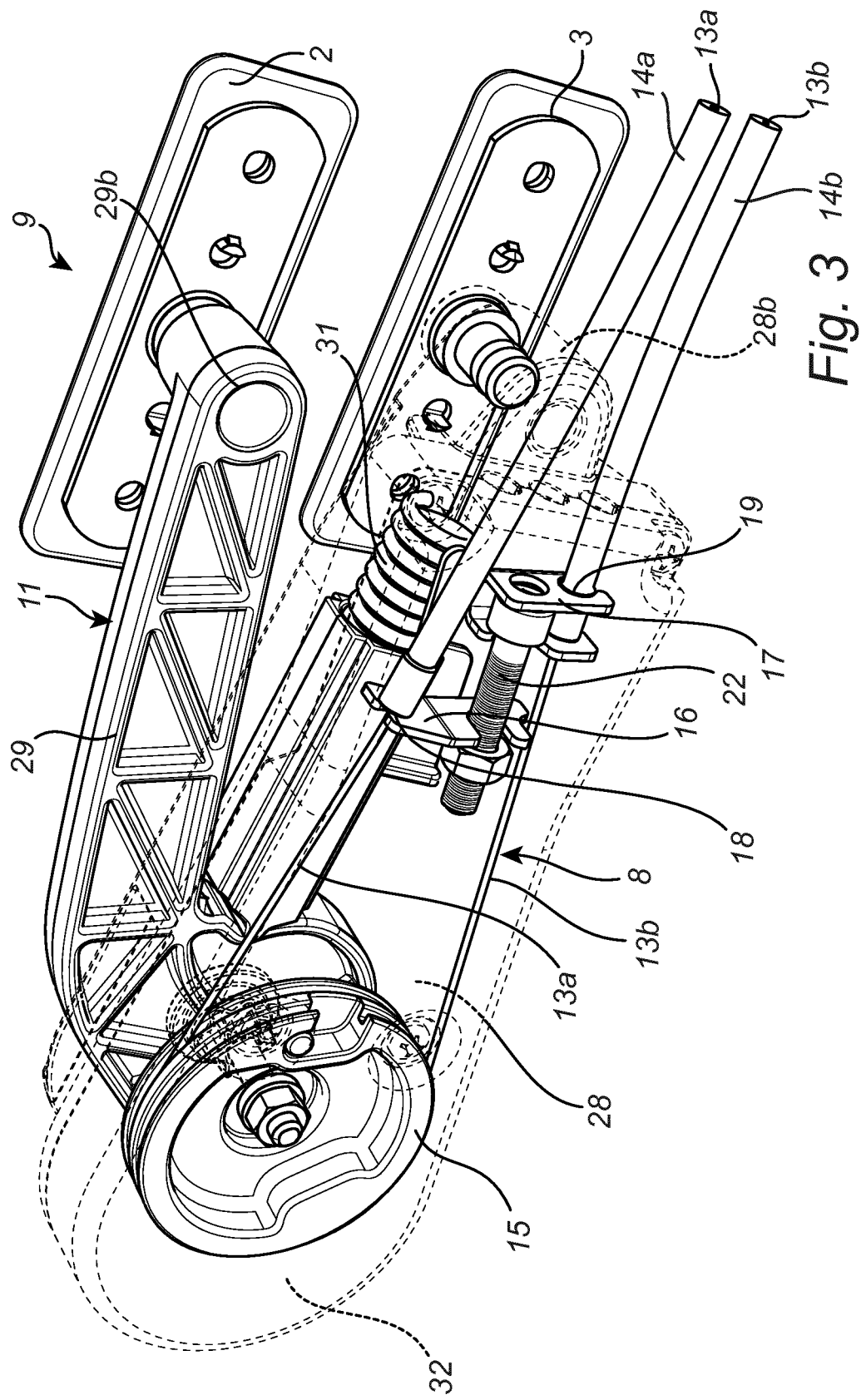
FIG. 3 illustrates an assembled view of the first lid lifter according to FIG. 2.

FIG. 2 shows an exploded view of the first lid lifter 9 illustrated in FIG. 1 and FIG. 3 shows an assembled view of the first lid lifter 9 illustrated in FIG. 2. The first lid lifter 9 comprises the first pivotable link arm 11 with the first link 28 and the second link 29. The first lid lifter 9 comprises the equalization arrangement 8 including the first and the second wire 13a, 13b being slideably arranged in the first and the second sleeve 14a, 14b, respectively. The equalization arrangement 8 furthermore comprises a wire-control device 15 in the form of a pulley, with the first and the second wires 13a, 13b being at least partly wound around and connected to the wire-control device 15 in a first wire first end 26 and in a second wire first end 27. The first lid lifter 9 furthermore comprises first support plates 16, 17. The first support plates 16 and 17 are provided with first openings 18 and 19 respectively through which openings 18, 19 the first and second wires 13a, 13b extend. When assembled, the sleeves 14a, 14b extend from the first support plates 16, 17 to the second support plate (not shown). The diameter of the openings 18, 19 are smaller than a diameter of the sleeves 14a, 14b. The second lid lifter 10 (shown in FIG. 4) may comprise a second wire-control device corresponding to the first wire-control device 15 shown in FIG. 2.

The sleeves 14a, 14b are provided with a first telescoping end portions 20, 21 abutting the first support plates 16, 17 at the first lid lifter 9. The telescoping end portions 20, 21 are arranged to adjust a tension of the respective wires 13a, 13b to an appropriate tension in case of, for example, slacking of the wire over time. The tension of the wires 13a13b may alternatively or additionally by adjusted by an adjustment bolt 22, here arranged between the first support plates 16, 17.

Figure 4:
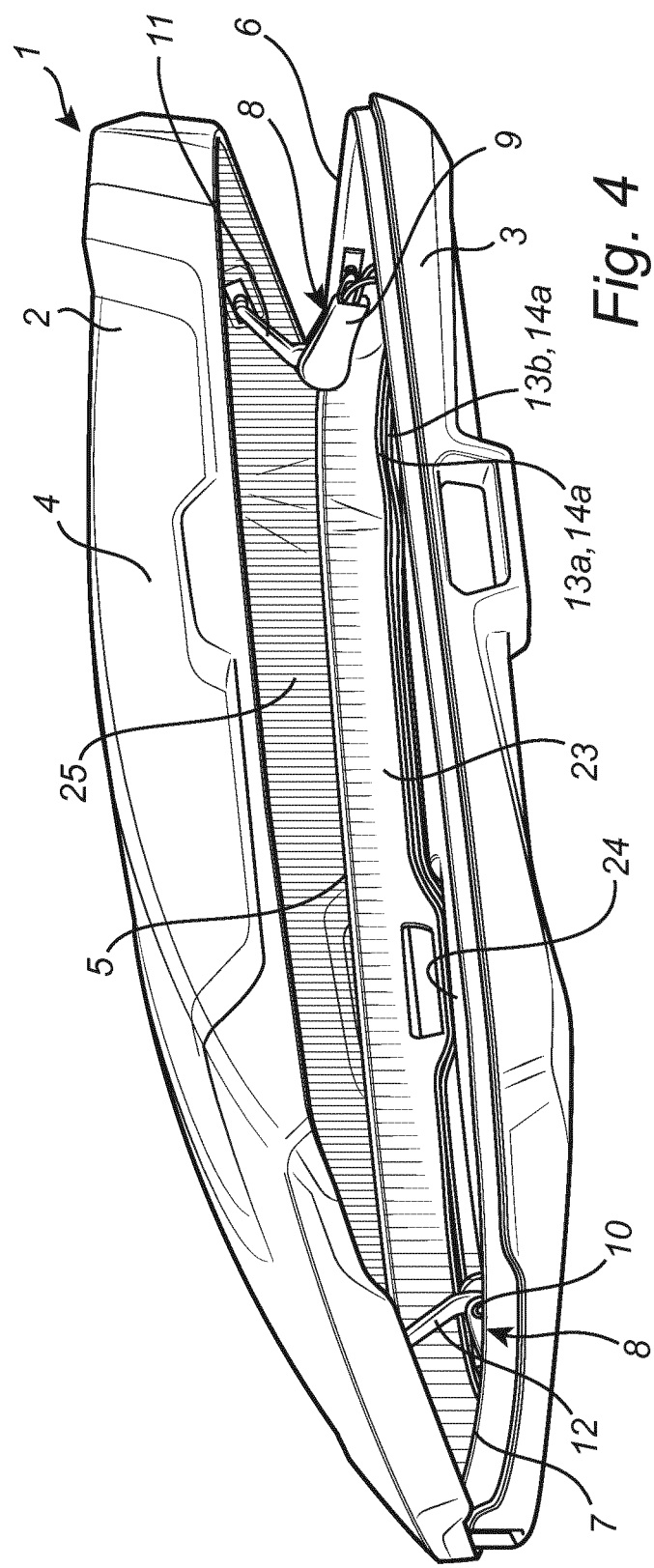
FIG. 4 illustrates a perspective view of a roof box according to the present disclosure.

FIG. 4 illustrates a vehicle roof box 1. The vehicle carrier box 1 comprises a lid 2 and a base 3. The carrier box 1 has first and second longitudinal sides 4, 5 and first and second transverse sides 6, 7. The lid 2 and the base 3 are connected by a first and a second lid lifter 9, 10. The first lid lifter 9 is arranged at the first transverse side 6 and the second lid lifter 10 is arranged at the second transverse side 7. The first lid lifter 9 comprises a first pivotable link arm 11 connecting the lid 2 to the base 3 and the second lid lifter 10 comprises a second pivotable link arm 12 connecting the lid 2 to the base 3. The equalization arrangement 8 comprises a first wire 13a arranged in a first sleeve 14a and a second wire 13b arranged in a second sleeve 14b. The wires 13a, 13b extend between the first and second lid lifters 9, 10 and are arranged in the base 3 along the longitudinal side 5 of the roox box 1. The wires 13a, 13b are attached to a side wall 23 of the base 3 not to interfere or get caught in the loaded goods. The wires may alternatively be attached to a bottom wall 24 of the base 3 or a side wall 25 or the roof of the lid 2.

The invention claimed is:

1. A vehicle carrier box, comprising:
a lid and a base, said carrier box having first and second longitudinal sides and first and second transverse sides, said lid and said base being connected by a first and a second lid lifter, said first lid lifter being arranged at said first transverse side and said second lid lifter being arranged at said second transverse side,
wherein said first lid lifter comprises a first pivotable link arm connecting said lid to said base, and said second lid lifter comprises a second pivotable link arm connecting said lid to said base, said first and second lid lifters comprising an equalization arrangement for equalization of the forces exerted by said first and second lid lifters on said lid upon opening of said lid,
wherein said equalization arrangement comprises a connector element connecting said first and said second lid lifter such that said first and said second lid lifter are hydraulically, mechanically, pneumatically, or a combination thereof, coupled to each other, said connector element being configured for power transmission and equalization of the forces between said first lid lifter and said second lid lifter being exerted on said lid by said lid lifters upon opening of said lid.

2. The vehicle carrier box according to claim 1, wherein said connector element comprises a wire.

3. The vehicle carrier box according to claim 2, wherein said wire is arranged in a sleeve having a sleeve diameter, said wire being slideably arranged within said sleeve.

4. The vehicle carrier box according to claim 2, wherein said first or said second lid lifter, or both, comprises a wire-control device, said wire being at least partly wound around said wire-control device, said wire control device being arranged to promote a distribution and equalization of forces when said lid is being pulled open, wherein said wire-control device comprises a pulley.

5. The vehicle carrier box according to claim 3, wherein said first lid lifter comprises one or more first support plate(s) being provided with a first opening through which said wire extends and wherein said second lid lifter comprises one or more second standing support plate(s) being provided with a second opening through which said wire extends.

6. The vehicle carrier box according to claim 5, wherein said sleeve extends from said first support plate(s) to said second support plate(s) and wherein said first and second openings have an opening diameter, said opening diameter being smaller than a diameter of said sleeve.

7. The vehicle carrier box according to claim 6, wherein said sleeve comprises one or more first telescoping end portion(s) abutting said one or more first support plate(s), a second telescoping end portion abutting said second support plate, or both, said telescoping end portions being arranged to adjust a tension of said wire.

8. The vehicle carrier box according to claim 5, wherein said first or said second lid lifter, or both, comprises an adjustment bolt connected to said first or second support plate, or both, respectively and arranged to adjust said tension of said wire.

9. The vehicle carrier box according to claim 1, wherein said base comprises a side wall and a bottom wall, said wire being attached, directly or indirectly, to said side wall or to said bottom wall, or both.

10. The vehicle carrier box according to claim 3, wherein said connector element comprises a first and a second wire being provided in a respective sleeve, wherein said first lid lifter comprises a first wire-control device and said second lid lifter comprises a second wire-control device, each of said wire-control device being in the form of a pulley, said first wire being connected to said first wire control device at a first wire first end and to said second wire control device at a first wire second end, said second wire being connected to said first wire control device at a second wire first end and to said second wire control device at a second wire second end, said wire control devices being arranged to promote distribution of forces between said lid lifters.

11. The vehicle carrier box according to claim 1, wherein said vehicle carrier box comprises at least a third and a fourth lid lifter, said third and said fourth lid lifters comprising the features of said first and said second lid lifters, respectively.

12. The vehicle carrier box according to claim 1, wherein said lid and said base are hingedly connected by one or more hinge elements arranged at said second longitudinal side of said carrier box.

13. The vehicle carrier box according to claim 1, wherein said vehicle carrier box is a roof box.

* * * * *